US008835807B2

(12) United States Patent
Obermueller et al.

(10) Patent No.: US 8,835,807 B2
(45) Date of Patent: Sep. 16, 2014

(54) WEB CONFIGURATION SYSTEM FOR CUSTOMIZING WELDING SYSTEMS

(75) Inventors: Timothy Dale Obermueller, Black Creek, WI (US); Kenneth Allen Fisher, Neenah, WI (US); Timothy Nathan Temby, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 451 days.

(21) Appl. No.: 13/281,245

(22) Filed: Oct. 25, 2011

(65) Prior Publication Data

US 2012/0103956 A1    May 3, 2012

Related U.S. Application Data

(60) Provisional application No. 61/407,288, filed on Oct. 27, 2010.

(51) Int. Cl.
*B23K 9/00* (2006.01)
*B23K 9/10* (2006.01)
*G06Q 30/06* (2012.01)

(52) U.S. Cl.
CPC .............. *B23K 9/1006* (2013.01); *G06Q 30/06* (2013.01)
USPC .................................. 219/137 R; 219/130.01

(58) Field of Classification Search
CPC ........................................ B23K 9/12–9/1336
USPC ....................... 219/130.01–130.5, 136, 137 R
See application file for complete search history.

(56) References Cited

U.S. PATENT DOCUMENTS

| 5,043,557 | A | * | 8/1991 | Tabata et al. | 219/130.51 |
| 5,278,390 | A | * | 1/1994 | Blankenship | 219/130.5 |
| 5,449,877 | A | * | 9/1995 | Buda et al. | 219/110 |
| 6,359,258 | B1 | * | 3/2002 | Blankenship et al. | 219/130.01 |
| 7,751,926 | B2 | * | 7/2010 | DiVenere et al. | 700/180 |
| 8,080,762 | B2 | * | 12/2011 | Martin et al. | 219/130.5 |
| 2006/0054610 | A1 | * | 3/2006 | Morimoto et al. | 219/130.5 |

(Continued)

FOREIGN PATENT DOCUMENTS

| CN | 1255682 | 6/2000 |
| CN | 101729546 | 6/2010 |
| JP | 2001293569 | 10/2001 |
| WO | 2008103520 A1 | 8/2008 |

OTHER PUBLICATIONS

International Search Report & Written Opinion for application No. PCT/US2011/057905 mailed Feb. 16, 2012.

*Primary Examiner* — Sang Y Paik
(74) *Attorney, Agent, or Firm* — Fletcher Yoder P.C.

(57) ABSTRACT

Embodiments of the present disclosure are also directed to a web-configuration system that includes at least one processor and one or more tangible, machine-readable media at least collectively including or storing instructions executable by the at least one processor. The instructions include a module configured to limit configuration options for a welding system based on user selection of a power source for the welding system, a module configured to calculate a weld cable size for the welding system based on the user selection of the power source and user selection of an input voltage, a module configured to assign weld cable characteristics based on the weld cable size and a user selected cable length, and a module configured to assemble a welding system order based at least on the user selection of the power source and the weld cable characteristics.

20 Claims, 9 Drawing Sheets

(56) References Cited

U.S. PATENT DOCUMENTS

| | | |
|---|---|---|
| 2006/0106682 A1 | 5/2006 | VanDyck |
| 2007/0257015 A1* | 11/2007 | Fosbinder et al. ....... 219/130.21 |
| 2008/0208387 A1 | 8/2008 | DiVenere |
| 2008/0264915 A1 | 10/2008 | Manthe |
| 2009/0039064 A1* | 2/2009 | Enyedy ........................ 219/132 |

\* cited by examiner

WEB CONFIGURATION SYSTEM FOR CUSTOMIZING WELDING SYSTEMS

CROSS REFERENCE TO RELATED APPLICATIONS

This application is a Non-Provisional patent application of U.S. Provisional Patent Application No. 61/407,288 entitled "Web Configuration System for Customizing Welding Systems", filed Oct. 27, 2010, which is herein incorporated by reference.

BACKGROUND

Embodiments of the present invention generally relate to custom welding systems and customization methods. Welding systems in general are complex machines with many different parts, including power supplies, wire feeders, cables, guns, and so forth.

Typically, welding systems are sold as packaged systems with preselected, built-in components and accessory items. However, customized systems can be acquired via traditional techniques. For example, customers may use welding catalogs to order individual components in order to build their own customized welding systems. However, customizing a welding system using traditional techniques can be complicated. Indeed, many customers may not have sufficient knowledge to individually order all the necessary and correct components that they need in order to build a complete and viable welding system. The components of welding systems are not easily interchangeable because different components often have different specifications (e.g., power ratings and connector types), which results in compatibility issues between components. Accordingly, customization using traditional techniques requires knowledge of each component needed, their specifications (e.g., size, power rating, connector type), and whether or not each component is compatible with the others.

It is now recognized that customers have different and unique welding needs, which require welding systems with custom component sets suited to their needs. However, a desired functionality for a welding system may not be found in a prepackaged system. It is also now recognized that traditional alternatives to acquiring prepackaged systems, such as purchasing individual components from a catalog, present additional obstacles for customers desiring a customized system. Indeed, traditional requirements for customization of welding systems often prevent customers from obtaining all the components needed to build a complete and viable welding system. The conventional systems and methods of purchasing welding systems make it difficult for customers to obtain welding systems with all of the specifications desired by the customers. Thus, it is now recognized that there is a market need for an effective way for customers to purchase complete and functional custom welding systems that meet their unique needs.

BRIEF DESCRIPTION

Embodiments of the present disclosure are directed to an article of manufacture including one or more tangible, machine-readable media at least collectively including or storing instructions executable by a processor. The executable instructions include instructions to receive input regarding a power source for a welding system, instructions to limit subsequent configuration options for the welding system to available configuration options based on the input regarding the power source, and instructions to display option menus for the available configuration options. The executable instructions also include instructions to receive input regarding an input voltage, and instructions to calculate a weld cable size for the welding system based on the input regarding the power source and the input regarding the input voltage. Further, the instructions include instructions to receive input regarding a desired weld cable length, instructions to assign a part number for a weld cable based on the weld cable size and the desired weld cable length, and instructions to define a welding system order based at least on the input regarding the power source, the input regarding input voltage, and the part number.

Embodiments of the present disclosure are also directed to a method of operating a web-configuration system for customizing a welding system. The method includes providing a configuration option for selection of a power source for the welding system with the web-configuration system. Additionally, the method includes receiving, at the web-configuration system, input regarding the power source for the welding system. The method also includes initiating, with the web-configuration system, a display of option menus for available configuration options that are limited based on the input regarding the power source. Further, the method includes receiving, at the web-configuration system, input regarding an input voltage at the web-configuration system, and calculating, with the web-configuration system, a weld cable size for the welding system based on the input regarding the power source and the input regarding the input voltage. Still further, the method includes receiving, at the web-configuration system, input regarding a desired weld cable length, and assigning, with the web-configuration system, a part number for a weld cable based on the weld cable size and the desired weld cable length. Also, the method includes defining, with the web-configuration system, a welding system order based at least on the input regarding the power source, the input regarding input voltage, and the part number.

Embodiments of the present disclosure are also directed to a web-configuration system that includes at least one processor and one or more tangible, machine-readable media at least collectively including or storing instructions executable by the at least one processor. The instructions include a module configured to limit configuration options for a welding system based on user selection of a power source for the welding system, a module configured to calculate a weld cable size for the welding system based on the user selection of the power source and user selection of an input voltage, a module configured to assign weld cable characteristics based on the weld cable size and a user selected cable length, and a module configured to assemble a welding system order based at least on the user selection of the power source and the weld cable characteristics.

DRAWINGS

These and other features, aspects, and advantages of the present disclosure will become better understood when the following detailed description is read with reference to the accompanying drawings in which like characters represent like parts throughout the drawings, wherein:

FIG. 3 is an exemplary view of a custom welding system design website after selecting a "Build Complete System" option from the home page shown in FIG. 2, in accordance with embodiments of the present techniques;

FIG. 7 is an exemplary view of a final price quote page of the customer welding system design website, in accordance with embodiments of the present techniques;

FIG. 8 is an exemplary view of a user information input page of the custom welding system design website, in accordance with embodiments of the present techniques;

Figure 9:
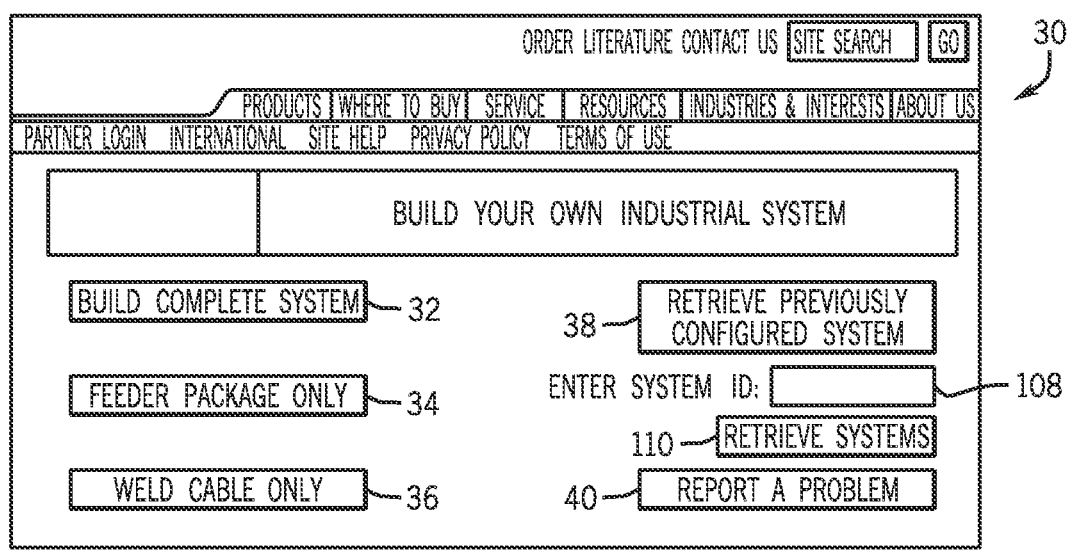
Figure 10:
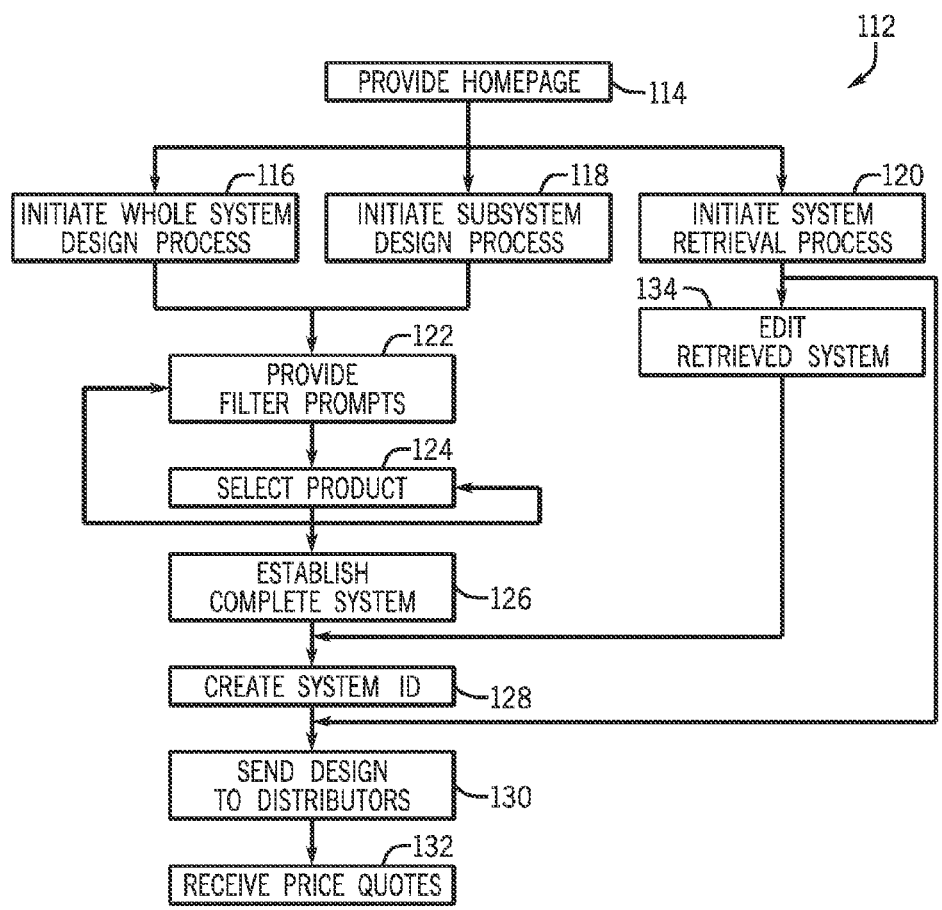

FIG. 9 is an exemplary view of the home page of the custom welding system design website after the "retrieve previously configured system" option is selected, in accordance with embodiments of the present techniques; and FIG. 10 is a diagrammatical view of an exemplary process of designing and obtaining a custom welding system under one embodiment of a customer welding system design system, in accordance with embodiments of the present techniques.

DETAILED DESCRIPTION

The present disclosure describes embodiments of a system for custom welding system design. When implemented, present embodiments direct users through an automated custom welding system design process. Accordingly, present embodiments provide the users with a large or maximum number of available component choices while maintaining component compatibility.

Figure 1:
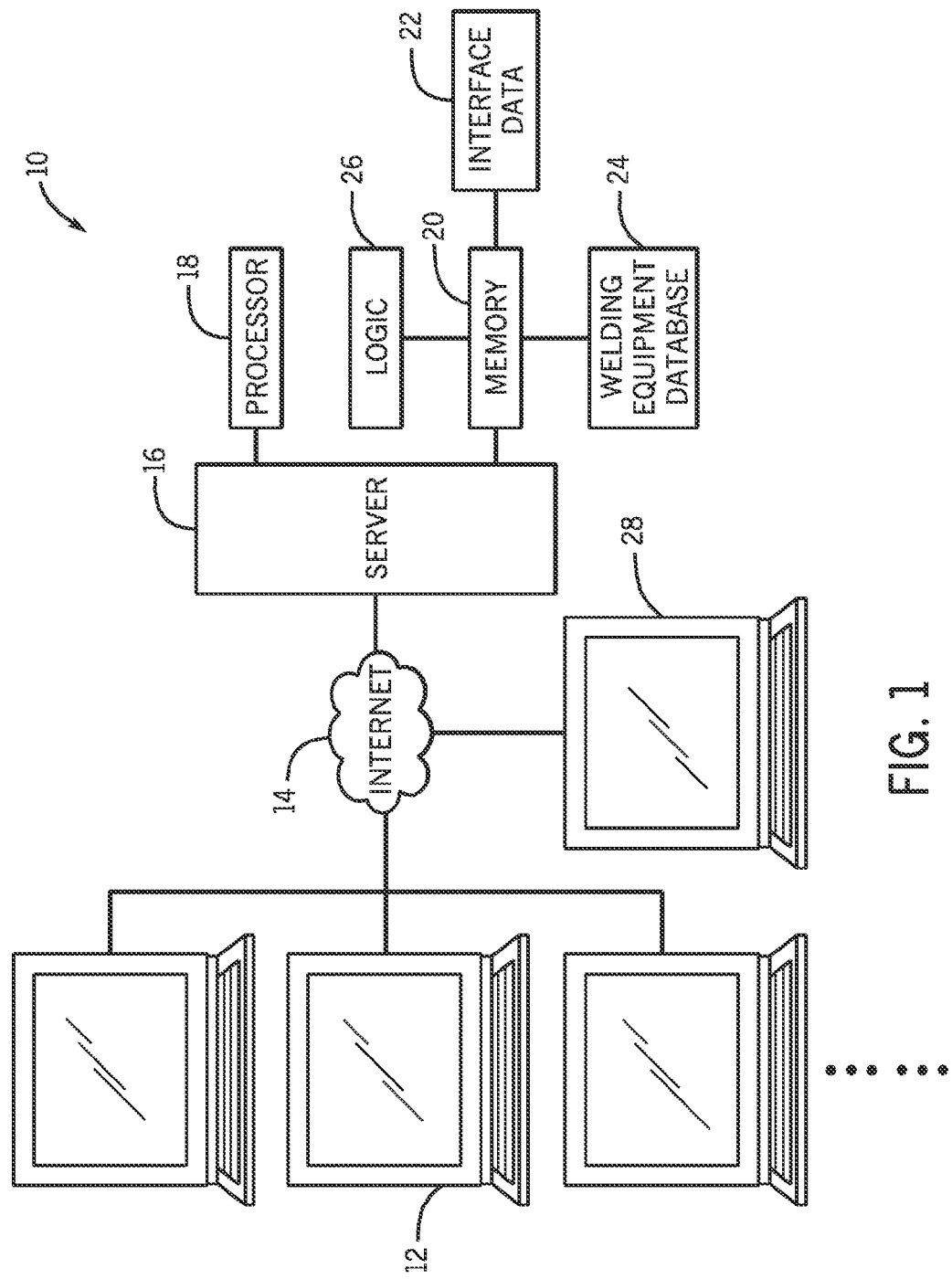
FIG. 1 is a diagrammatical representation of one embodiment of a custom welding system design system, in accordance with embodiments of the present techniques.

As described in detail below and illustrated in FIG. 1, one embodiment of the presently disclosed custom welding system design system 10 includes one or more computing devices 12 being connected, via an internet connection 14, to a custom welding system design server 16, such that a user can access the custom welding system design server 16 from the computing device 12. The computer device 12 is generally a personal computing device such as a computer, cellular telephone, tablet computer, and so forth. The computing device 12 generally includes a processor, memory, display, and user interfacing elements such as buttons, knobs, selectors, and so forth. In one or more embodiments, the display may have touch-sensitive properties, such that the display is also the user interfacing element, as in a touch-screen. The computing device 12 is generally accessed by the user to interface with the custom welding system design system 10.

In the illustrated embodiment, the welding system design server 16 is coupled to or includes a processor module 18 and a memory module 20. The memory module 20, which is representative of at least one tangible, machine-readable media, stores instructions that are executable by the processor module 18 to perform certain actions (e.g., provide an interface, receive inputs, process the inputs, and provide outputs). The memory module 20 may include or store various software modules for providing access and performing data operations. For example, the memory may store a webpage and interface data 22 as well as a welding equipment database 24 (e.g., a data table), accompanying logic 26, and other data. It should be noted that a webpage is merely one type of interface feature in accordance with present embodiments.

In the illustrated embodiment, the custom welding system design system 10 also includes third party computers 28 that may be connected to the welding system design server 16 and/or the computing devices 12 via the internet 14. The third party computers 28 may be operated by welding equipment distributers, manufacturers, or other industry affiliates who may facilitate the custom welding system design and purchasing process. For example, one or more third party distributers may be selected by the user to receive information regarding their custom welding system design. The third party distributors may then contact the user with price quotes, incentives, delivery information, and so forth, relating to the purchase of their custom welding system. In operation, this may include the welding system design server 16 accessing databases on the third party computers 28, populating the welding equipment database 24 based on information obtained via the third party computers 28, or the like.

One or more embodiments may lack an internet connection between the computing device 12 and the server 16. The computing device 12 may be accessing the server 16 via cables or other connection methods. This may be the case if a user is using a computing device 12 such as a desktop or laptop computer to access the server 16 onsite where the server 16 is physically located. For example, one or more embodiments may comprise a brick and mortar shop, wherein customers come in and design their system on a computing device 12 physically connected to the server 16, or on the server 16 itself.

Some embodiments may have the web pages and interface data 22, welding equipment database 24, and accompanying logic 26 stored on the computing device 12 rather than on the server 16. Accordingly, an order can simply be generated and submitted from the computing device 12 to a provider. In one or more embodiments, the user may download or install the web pages and interface data 22, welding equipment database 24, and accompanying logic 26 as a program onto their computing device 12. In this case, the processing would occur on the user end, and the processed data would be transmitted to the server 16 and possibly to the third party instead of transmitting unprocessed data at each user interaction with the program interface.

Figure 2:
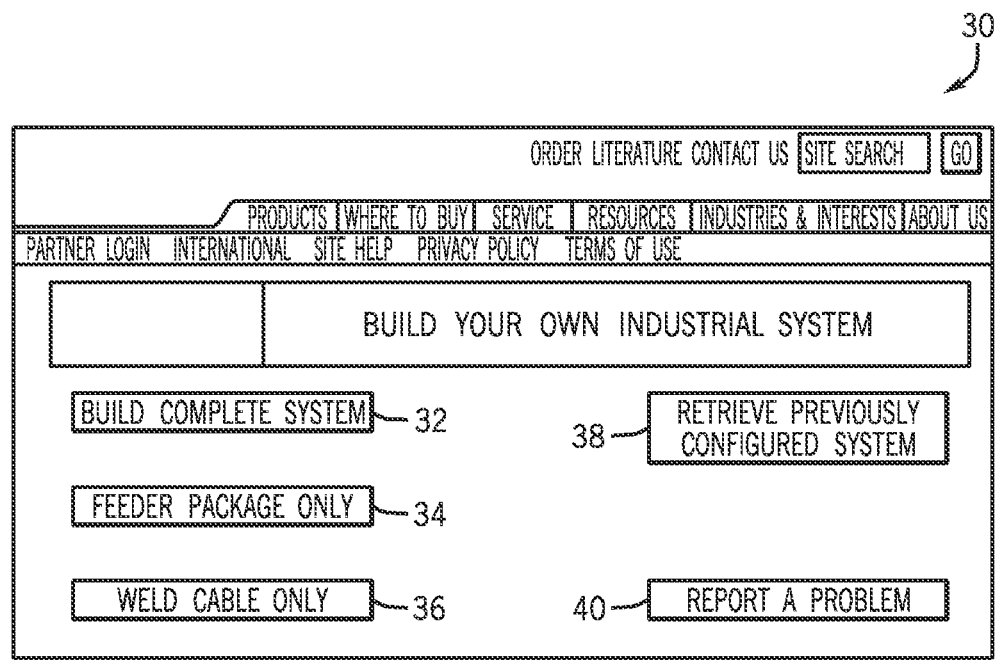
FIG. 2 is an exemplary view of a home page of a custom welding system design website, in accordance with embodiments of the present techniques.

In the illustrated embodiment, the custom welding system design system 10 is exemplified as an interactive website. Turning to FIG. 2 of the present disclosure, an exemplified home page 30 of the website includes different options for initiating the welding system design process. Each of these options relates to guiding the user through a design process to obtain a welding system suitable to their needs. The user may select one of the listed options to begin. Some additional embodiments may have more, less, or different links on the home page 30 than shown in the illustrated embodiment.

Selecting a "build complete system" link 32 initiates a complete system design process, guiding the user through a process of selecting all the necessary components needed to build a complete welding system. Selecting a "feeder package only" link 34 takes the user to the feeder package section only, bypassing selection of other components unrelated to feeders. Likewise, selecting a "weld cable only" link 36 will take the user to the weld cable section only. These options are for users who only need to build or buy components for a part of a complete welding system rather than the entire system.

A "retrieve previously configured system" link 38 allows the user to access one of their previously designed custom welding systems, allowing easy reordering or modification of previously stored design selections. A "report a problem" link 40 allows the user to report any issues encountered while using the website, allowing for timely resolution of website problems for a better user experience.

In one or more embodiments, the custom welding system design system 10 may be configured to automatically detect the setting of the computing device 12, such as an associated browser type and so forth, allowing the website to adjust its own format to be compatible with the user's computing device 12. Similar features may also be utilized to identify a customer and obtain previous preferences or submissions.

Figure 3:
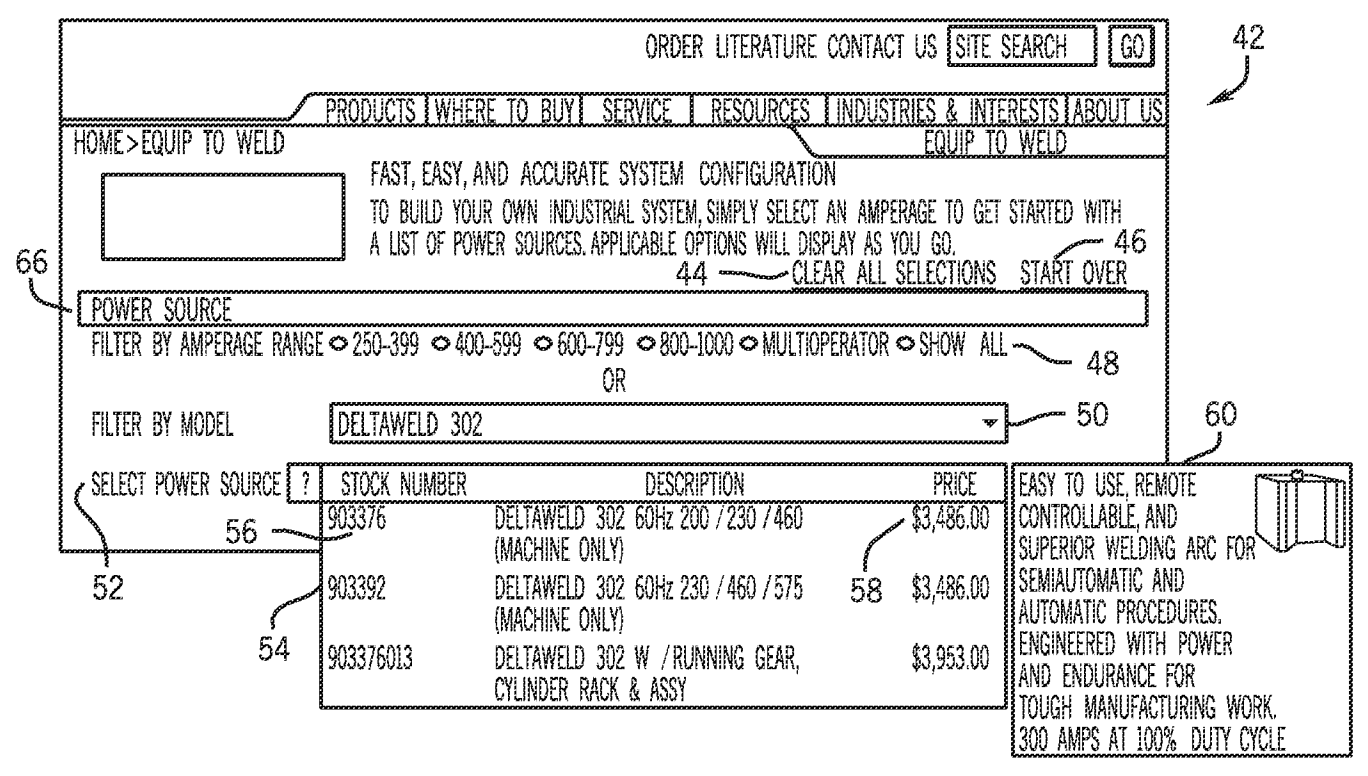

In one embodiment, selecting the "build complete system" link 32 on the home page 30 directs the user to a power supply selection page 42, shown in FIG. 3. The power supply selection page 42 includes a "clear all selections" link 44, through which the user can clear all the selections previously made on the current page, and a "start over" link 46 which allows the user to revert back to the very beginning of the design process.

In the power supply selection page 42, there may be inputs for one or more filters. For example, in the illustrated embodiment, there are radio-button filters 48 and dropdown filters 50, as shown in FIG. 3. In other embodiments, different types and combinations of filters may be employed. Filters such as the radio-button filters 48 and dropdown filters 50 help eliminate power supply choices based on criteria such as amperage range and model. Generally, in the illustrated embodiment, each radio-button filter 48 and each dropdown filter 50 contains at least one selectable category. The categories generally represent a specific attribute, such as having a certain power rating, being a certain model, etc. Each category is associated with the power supplies having the respective attribute. Indeed, a database may be employed to make such correlations In one embodiment, every power supply available in the welding equipment database 24 fits into at least one category of every dropdown filter 50 and radio-button filter 48. In the illustrated embodiment, the radio-button filter 48 classifies power supplies by amperage rating while the dropdown filter 50 classifies the same set of power supplies by model. Thus, in accordance with present embodiments, the user can use either type of filter to filter the power supplies depending on their familiarity and need. For example, if the user is not familiar with the different power supply models, the user may opt to use the amperage radio-button filter 48 to further refine the power supply choices in accordance with needs. Further, if the user knows the model of interest, the user may bypass the amperage filter and select a model from the model menu provided by the dropdown filter 50 to further refine the power supplies. Again, different inputs, menus, and filters may be employed for such functions in accordance with present embodiments.

Based on initial selections, subsequently available selections may be filtered using a look-up table. Indeed, a data table or look-up table may be available or accessible via the system 10. Such a data table may function to correlate component compatibilities. For example, when a particular component (e.g., a power supply) is selected for a welding system, the selected component may be found in the look-up table and compatible components may be identified using the look-up table. Accordingly, the look-up table can be used as a reference such that only compatible components may be made available for subsequent selection during system configuration. Some other embodiments may be configured to include more, less, or different filters.

In the present embodiment, the power supply is the first component to be selected for the custom welding system, hence the power supply selection is the initial selection page when the "build complete system" link 32 (FIG. 2) is selected. However, in one or more embodiments, the power supply selection page 42 may be replaced by a selection page for another welding item.

After one or more filters have been applied, an item selection prompt 52 may prompt the user to select a product. In the present embodiment, the item selection prompt 52 is in the form of a dropdown product menu 54, which displays a list of the remaining items, all of which are compatible with any previous selections. As illustrated by FIG. 3, in one embodiment, when the user's selection tool (e.g. mouse) hovers over an item on the dropdown product menu 54, the item may become a highlighted item 56. An item price 58 may be shown in the dropdown product menu 54 as well. Additionally, in some embodiments, a product preview 60 appears as the user's selection tool hovers over an item, as shown in FIG. 3. The product preview 60 may include a picture and a brief description and can be located in various areas of the interface.

Figure 4:
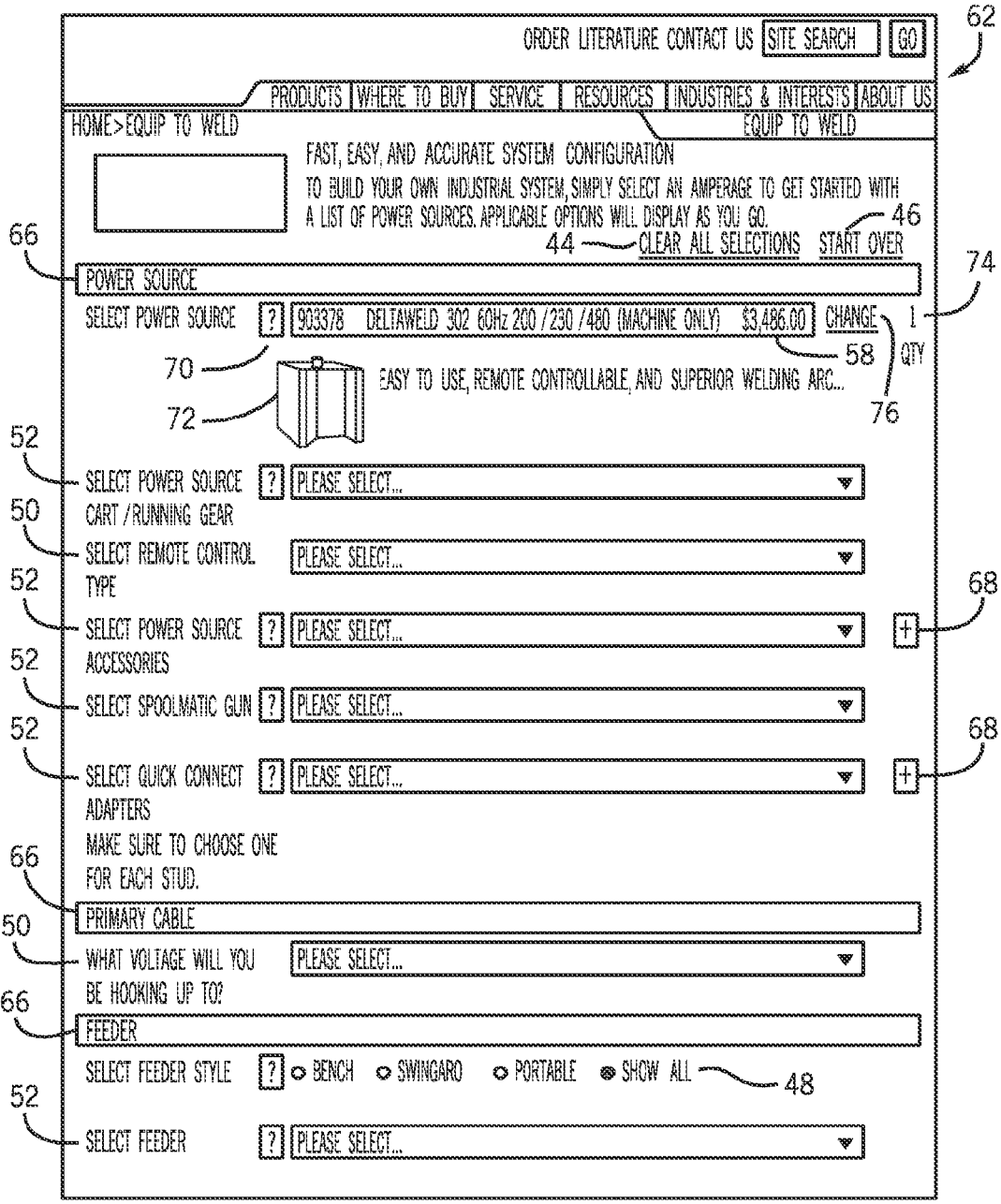
FIG. 4 is an exemplary view of a custom welding system design website of FIG. 3 after a power supply is selected, in accordance with embodiments of the present techniques.

FIG. 4 shows one embodiment of a continued selection page 62. The continued selection page 62 is presented after the user selects a power supply (FIG. 3). Some other embodiments may be configured such that the continued selection page 62 follows an initial selection page for selecting an initial component other than the power supply. Accordingly, the initial product selection restricts the subsequent filters and products to maintain compatibility. In other words, the selection that the user makes in the initial selection page 42 determines what types of subsequent filters are presented and how they are populated. Generally, the continued selection page 62 guides the user through the selection of all the other necessary welding components needed in addition to the already selected initial product.

As illustrated in FIG. 4, the present embodiment includes several filters and item selection prompts 52 for selecting various welding system components and accessories. Filters and selections may be organized in different fashions, as will be realized by one skilled in the art. There may be cases where the user wants to make more than one selection from an item selection prompt 52. The illustrated embodiment handles this by providing an additional item option 68 next to the item selection prompt 52 which when selected, will produce an item selection prompt 52 populated with the same list of items. This process can be repeated to select multiple products. FIG. 4 shows one embodiment of what a portion of the continued selection page may look like. However, it is important to note that the continued selection page 62, and any other page, may be populated with filter types other than radio-button or dropdown styles, and may be organized in other fashions. The welding components and accessories may also be different and in a different order.

In the present embodiment, the continued selection page 62 is generally divided into several product sections 66, with filters 50 and product selection prompts 52 relating to a certain product type being under the appropriate product section 66. In one or more embodiments, the continued selection page 62 may be configured to be a collection of different pages.

In the present embodiment, the filters 50 of the continued selections page 62 may be configured to include one or more categories, of which all possible remaining products, so long as they are compatible with all previous selections, are categorized into. Some products may be categorized into more than one category, but all compatible products belong to some category of each filter. In addition to filters 50, the continued selections page 62 also includes several item selection prompts 52. After a selection is made in either a filter 50 or an item selection prompt 52, the next filter 50 or item selection prompt 52 is generally automatically populated with only a list of options that have the selected attribute, are compatible with the selected item, or in another way correspond to the previous selection. The possible options, whether they are categories of filters 50 or items of item selection prompts 52, are updated each time a filter 50 or item selection prompt 52 is answered. Generally, this can be done by referencing the welding equipment database 24 in the memory 20 of the server 16 containing data on each products specification. There may be a number of different ways of organizing and linking the data, as well as different logic used to populate the filters 50 and item selection prompts 52 with the appropriate choices. In one embodiment, some filters 50 and item selection prompts 52 are populated by performing real time calculations of parameters inputted from previous filters 50 or item selection prompts 52. In this case, less information about each item may need to be stored in the memory 20. Rather, some information may be deduced by calculations performed in the processor 18. Accordingly, logic and programming for performing such calculation may be generally included in the memory.

Figures 5, 6:
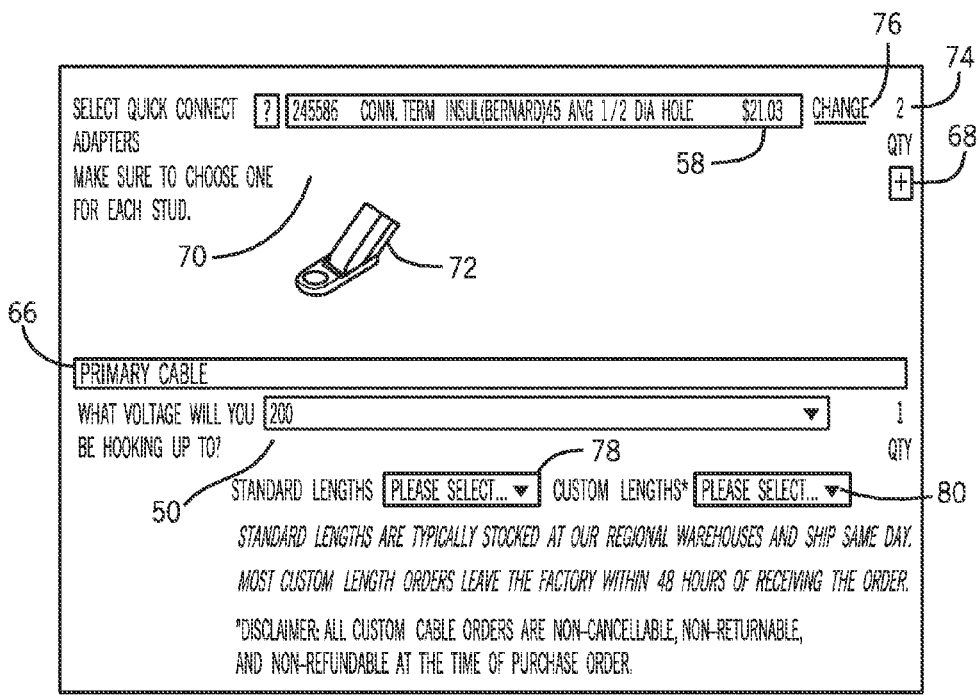
FIG. 5 is an expanded view of a portion of FIG. 4, showing interface changes after selections are made, in accordance with embodiments of the present techniques.
FIG. 6 is an exemplary view of an aspect of the custom welding system design website known as a "running price quote", in accordance with embodiments of the present techniques.

FIG. 5 shows an expanded portion of the continued selection page 62 of FIG. 4 in which a connector has been selected. An added item indication 70 is shown along with an item picture 72 and the item price 58. The present embodiment also includes a quantity input box 74 where the user can input the desired quantity of the chosen item. There is also a change selection link 76 where the user can change the selected item. The change selection link 76 may not be included because, in some embodiments, the dropdown product menu may remain active even after an item is chosen so that the user can change the item directly from the menu.

One or more embodiments of the present disclosure provide a way to purchase cables of custom or standard lengths. As shown in FIG. 5, the user can either select a standard length of cable via a standard length menu 78 or a custom length of cable via a custom length menu 80. In the illustrated embodiment, the inputs 78 and 80 are dropdown filters. However, in other embodiments, different menus or filters can be used. The provision of such inputs allows a user to give instructions to the supplier regarding the type of cable to be provided. Standard cable lengths are precut cables which are generally available in a few predetermined sizes, while custom cable lengths may be cut to generally any length desired. When a custom length cable is selected, in one embodiment, the length becomes a component of an order number or code that is provided to a supplier. For example, 903121-12.5-6-8 is an example of an order code that may be generated by the system 10 in response to a user's request for a cable with a 12.5 foot length. The first number (903121) in the code may correspond to a type of cable, the second number (12.5) may refer to the cable length in feet, and the last two numbers (6 and 8) may refer to connector types for the custom cable. By integrating the requested length into the order code, the system 10 provides integral instructions to workers providing cable.

FIG. 6 illustrates a running price quote 82 that may be included in some embodiments. The running price quote 82 keeps track of what items have been added and includes the item number 84, item price 58, quantity 88, an individual total item price 90, and a total system price 92. The running price quote 82 automatically updates each time an additional item is selected. In the illustrated embodiment, the running price quote is configured to remain in the same position on the screen as the user navigates through different pages.

Figure 7:
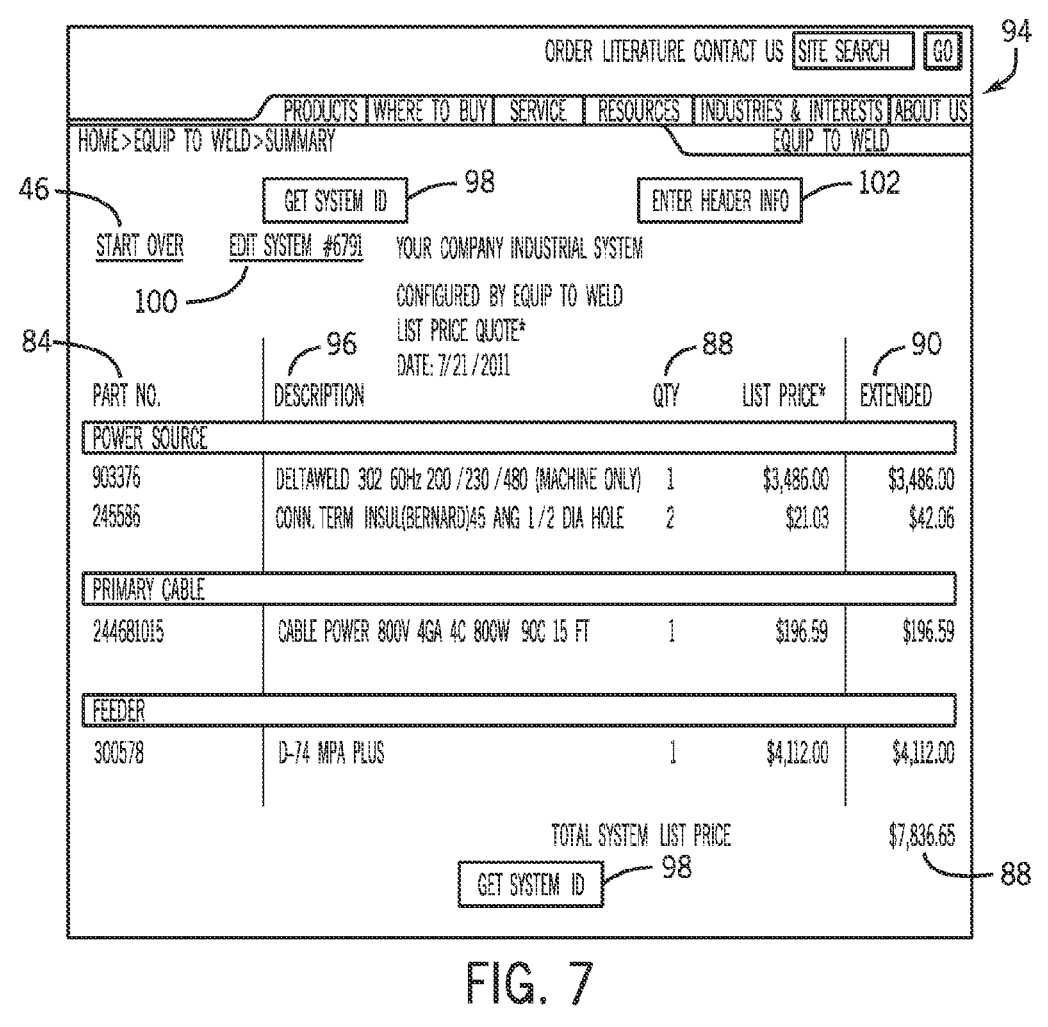
Figure 8:
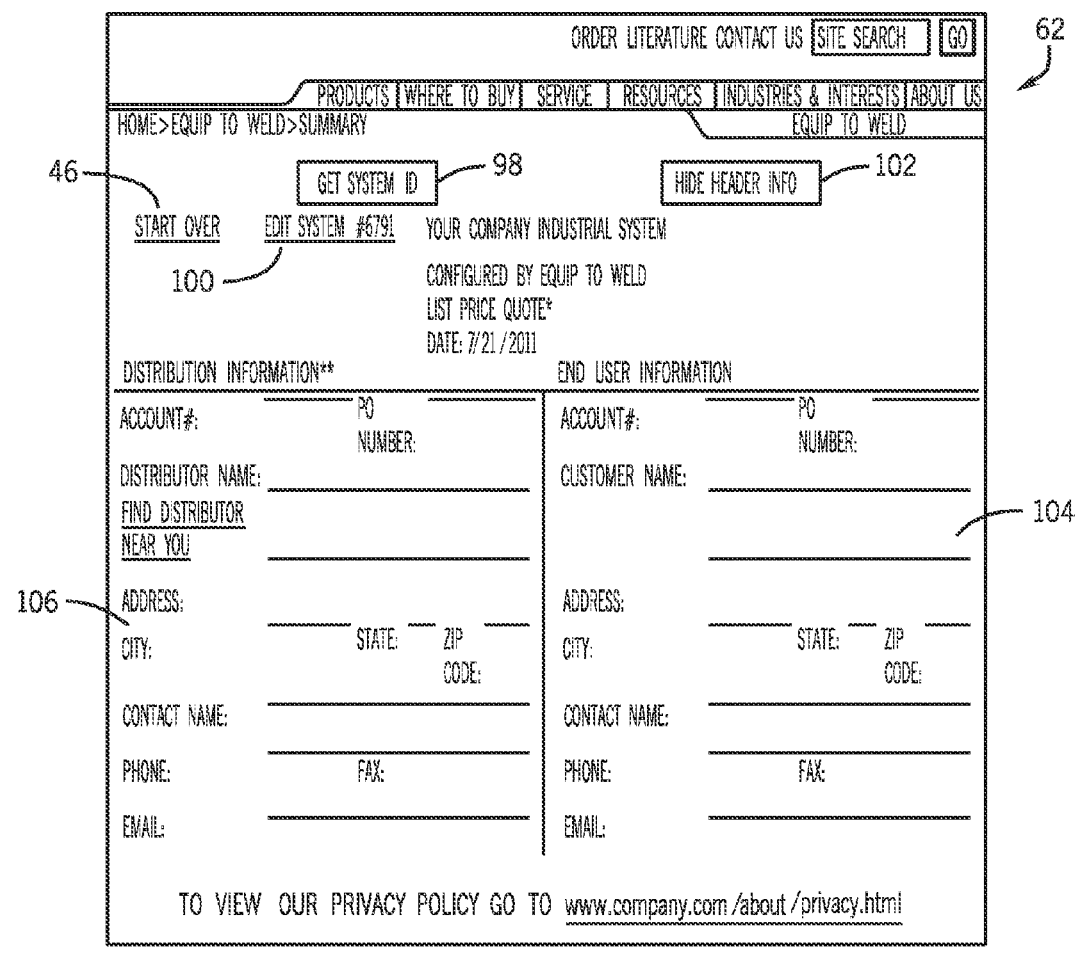

FIG. 7 is a representative system review page 94 which summarizes all of the components selected in a table 96 as well as the quantity 88 and total price by item 90. From this page, the user can save this set of selections, or system, by choosing the get system ID option 98. The get system ID option will generate an ID code for the system so it can be saved and retrieved later. The user can also further edit the system by selecting the edit system option 100. At this point, the user can also select the enter header option 102, the effects of which is illustrated in FIG. 8. In the illustrated embodiment of FIG. 8, the user is prompted with a plurality of user information data fields 104 and distributor information data fields 106. The data fields may ask for contact information and/or an assortment of other information. This may facilitate producing a proper header for an invoice and facilitate the ordering process. Indeed, in accordance with present embodiments, various distributors can use the output of the system 10 to generate an invoice with custom headers.

After the user completes a welding system order, the order and user contact info may be automatically forwarded to user-selected or recommended third parties, such as distributors, to begin a quoting and bidding process. Though the custom welding system design system 10 may provide the user with a retail price, that price may be subject to further discounts and incentives when the system is purchased through a distributor. The communicative functions of the custom welding system design system may be configured to perform a variety of different automated tasks and information distribution in order to facilitate the design, manufacture, and purchasing process for all parties. This may include automatically sending system components and other specifications to distributor, sending specific component information to specific component manufacturers, and sending other various useful data to various business units.

FIG. 9 is another view of the home page 30. In the illustrated embodiment, when the user selects the retrieve previously configured system option 38, an enter system ID prompt 108 appears with a retrieve system button 110. Here, the user can enter the ID code of a previously designed welding system and view the system review page 94 correlating with the ID code, where the user can reorder the system or edit the system.

One or more embodiments of the custom welding system design system also allow the user to only design and purchase individual welding parts or subsystems without going through the entire system design. For the example, one such embodiment is illustrated by FIG. 2. Here, the user can select the feeder package only option 34 or the weld cable only option 36. The user will then be directed to an interface with product filters and selection prompts related to that subsystem only. Different embodiments may have different subsystems to choose from and may structure and organize products differently. Some embodiments may break down the subsystems more or less, offering different levels of abstraction.

The weld cable only option 36 allows the customer to order custom secondary cables and terminating ends for new or existing welding systems. When the weld cable only option 36 has been selected, the customer may be prompted to provide specifications regarding the welding system power source the present secondary cable selection is to be used with. Such specifications may include an amperage rating. The customer may also be prompted to select a desired parameter of the secondary cable, such as length or size. In the present embodiment, establishing the amperage of the power source determines a fixed variable, or correlation, between the secondary cable length and the secondary cable size. Accordingly, the custom welding system design system 10 includes algorithms that enable it to calculate the suitable secondary cable length in response to a user input of power source amperage and desired secondary cable size. Likewise, the custom welding system design system 10 is able to determine a suitable cable size in response to a user input of power source amperage and desired secondary cable length. FIG. 10 is a process flow diagram illustrating one embodiment of a welding system design process 112 in accordance with present techniques. The process illustrated in FIG. 10 may be implemented using the custom welding system design system 10. The design process 112 is represented by various blocks that are indicative of steps or actions performed during the process. Further, the illustrated process is representative of an embodiment employed via an interactive website or interface. Thus, the process begins with providing a home page display, as represented by block 114.

The home page display (e.g., home page 30), enables a user to choose whether it is desirable to design a whole system, design a subsystem, or retrieve a previously established system. Accordingly, block 116 represents initiation of a process for designing a whole system, block 118 represents initiation of a process for designing a subsystem, and block 120 represents initiation of a process for retrieving a system. Each of these processes can be initiated based on a user's selection of a link on the home page.

If the user chooses to either design a whole system or a subsystem, the user is guided through a series of filters. Block 122 represent providing filter prompts. Each filter prompt may include selections that have been narrowed based on previous selections. After each filter has been appropriately addressed, there is a possibility that the user will be prompted to select a product, as represented by block 124. After selecting a product, the user may be prompted with more filters and prompted to selected more products until a completed system is established, as represented by block 126. The system 10 may then create a system ID, as represented by block 128, to save the system design. The next step may be to send design information to distributors (block 130), and then receive price quotes (block 132), at which point the process is completed.

If the user decides to immediately retrieve a system, rather than design a whole system or subsystem, the user is prompted to edit the retrieved system, as represented by block 134. If the user chooses, the system 10 edits welding system characteristics in response to user inputs, creates another system ID (block 128) (including replacing an existing system ID), sends design information to distributors (block 130), and then receives a price quote (block 132). However, if the user does not wish to edit the retrieved system, the editing can be bypassed and the process can proceed directly to block 130 and 132.

The present disclosure represents embodiments of a custom welding system design system 10, a system that allows users to design a custom welding system that meets their unique needs by selecting each component individually while maintaining component compatibility. The presently disclosed invention may allow users to create unique welding systems, providing a significant advancement in the welding industry.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An article of manufacture comprising:
one or more tangible, machine-readable media at least collectively comprising instructions executable by a processor, the instructions comprising:

instructions to receive input regarding a power source for a welding system;
instructions to limit subsequent configuration options for the welding system to available configuration options based on the input regarding the power source;
instructions to display option menus for the available configuration options;
instructions to receive input regarding an input voltage;
instructions to calculate a weld cable size for the welding system based on the input regarding the power source and the input regarding the input voltage;
instructions to receive input regarding a desired weld cable length;
instructions to assign a part number for a weld cable based on the weld cable size and the desired weld cable length; and
instructions to define a welding system order based at least on the input regarding the power source, the input regarding input voltage and the part number.

2. The article of manufacture of claim 1, wherein the instructions comprise instructions to filter available inputs for the power source based on an amperage range for the welding system or based on a model number for the welding system.

3. The article of manufacture of claim 1, wherein the instructions comprise instructions to provide options for inputs as items in one or more drop down menus.

4. The article of manufacture of claim 3, wherein the instructions comprise instructions to sort the items alphanumerically by clicking a header of the one or more drop down menus.

5. The article of manufacture of claim 3, wherein the instructions comprise instructions to display a product image and/or detailed description associated with a one of the items when a cursor is positioned over the one of the items.

6. The article of manufacture of claim 1, wherein the instructions comprise instructions to display information about a particular option menu when a cursor is positioned over a graphic feature proximate the particular option menu.

7. The article of manufacture of claim 1, wherein the part number incorporates a customized cable length.

8. The article of manufacture of claim 1, wherein the part number is based on a standard cable length that is determined based on the desired weld cable length.

9. The article of manufacture of claim 1, wherein the instructions comprise instructions to define a feeder by enabling selection of a feeder type.

10. The article of manufacture of claim 9, wherein the instructions comprise instructions to enable selection of a gun type or drive roll type from a list of choices limited by the defined feeder type.

11. The article of manufacture of claim 10, wherein the instructions comprise instructions to select a contact type from a list of choices limited by the selected gun type.

12. The article of manufacture of claim 10, wherein enabling selection of the gun type comprises providing a menu with at least one free gun, wherein characteristics of the at least one free gun are based on whether a single feeder or dual feeder is selected.

13. The article of manufacture of claim 10, wherein the instructions comprise instructions to enable selection of the gun type by selecting a standard gun or a customized gun.

14. The article of manufacture of claim 1, wherein the instructions comprise instructions to enable configuration of secondary cables with size options, termination options, and length options.

15. The article of manufacture of claim 14, wherein the instructions comprise instructions to determine a suggested size for the secondary cables based on characteristics of the weld cable and an output amperage of the welding system.

16. The article of manufacture of claim 1, wherein the instructions comprise instructions to prompt for all available options of the welding system, wherein the available options are limited based on previously selected options.

17. A method of operating a web-configuration system for customizing a welding system, comprising:
    providing a configuration option for selection of a power source for the welding system with the web-configuration system;
    receiving, at the web-configuration system, input regarding the power source for the welding system;
    initiating, with the web-configuration system, a display of option menus for available configuration options that are limited based on the input regarding the power source;
    receiving, at the web-configuration system, input regarding an input voltage at the web-configuration system;
    calculating, with the web-configuration system, a weld cable size for the welding system based on the input regarding the power source and the input regarding the input voltage;
    receiving, at the web-configuration system, input regarding a desired weld cable length;
    assigning, with the web-configuration system, a part number for a weld cable based on the weld cable size and the desired weld cable length; and
    defining, with the web-configuration system, a welding system order based at least on the input regarding the power source, the input regarding input voltage and the part number.

18. The method of claim 17, comprising providing options that enable configuration of secondary cables for the welding system based on inputs that enable selection of feeder type, a gun type, and a drive roll type.

19. A web-configuration system, comprising:
    at least one processor;
    one or more tangible, machine-readable media at least collectively comprising instructions executable by the at least one processor, the instructions comprising:
    a module configured to limit configuration options for a welding system based on user selection of a power source for the welding system;
    a module configured to calculate a weld cable size for the welding system based on the user selection of the power source and user selection of an input voltage;
    a module configured to assign weld cable characteristics based on the weld cable size and a user selected cable length; and
    a module configured to assemble a welding system order based at least on the user selection of the power source and the weld cable characteristics.

20. The web-configuration system of claim 19, comprising a feeder selection module configured to define a feeder type, gun type, and drive roll type based on user selection of options.

* * * * *